(12) United States Patent
Sekitani et al.

(10) Patent No.: US 11,437,884 B2
(45) Date of Patent: Sep. 6, 2022

(54) ADJUSTABLE MOTOR DRIVE

(71) Applicant: Saudi Arabian Oil Company, Dhahran (SA)

(72) Inventors: Yoshio Sekitani, Dhahran (SA); Hussain A. Balfagih, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 291 days.

(21) Appl. No.: 16/793,385

(22) Filed: Feb. 18, 2020

(65) Prior Publication Data
US 2021/0257879 A1 Aug. 19, 2021

(51) Int. Cl.
*H02K 5/26* (2006.01)
*H02K 15/14* (2006.01)

(52) U.S. Cl.
CPC .............. *H02K 5/26* (2013.01); *H02K 15/14* (2013.01)

(58) Field of Classification Search
CPC  H02K 5/26; H02K 15/14; F16M 1/00; F16M 7/00; F16B 5/0225
See application file for complete search history.

(56) References Cited

U.S. PATENT DOCUMENTS

| | | | | |
|---|---|---|---|---|
| 1,511,336 | A | * | 10/1924 | Hoey ...................... F16M 7/00 248/656 |
| 3,066,898 | A | * | 12/1962 | Haynes ................... F16M 7/00 248/656 |
| 3,652,044 | A | | 3/1972 | Manross |
| 3,983,429 | A | * | 9/1976 | Allardice, Jr. ........... H02K 5/24 310/91 |
| 4,012,021 | A | | 3/1977 | Duceppe |
| 4,033,531 | A | | 7/1977 | Levine |
| 5,488,259 | A | | 1/1996 | Cho |
| 5,975,480 | A | | 11/1999 | Schaefer et al. |
| 7,191,998 | B1 | * | 3/2007 | Chalberg ................. F16M 7/00 248/676 |
| 9,337,707 | B2 | * | 5/2016 | Dixon ....................... H02P 6/06 |
| 10,465,836 | B2 | * | 11/2019 | Copanas .................. F16M 5/00 |

FOREIGN PATENT DOCUMENTS

| | | |
|---|---|---|
| CN | 206908448 | 1/2018 |
| DE | 899067 | 12/1953 |
| EP | 2525476 | 11/2012 |

OTHER PUBLICATIONS

Eldho, "Induction Motor Drive With Low Cost Converter and ZVS Inverter" International Journal of Innovative Research in Electrical, Electronics, Instrumentation, and Control Engineering, Feb. 2014, 2(2): 1076-1080.

(Continued)

*Primary Examiner* — Anita M King
(74) *Attorney, Agent, or Firm* — Fish & Richardson P.C.

(57) ABSTRACT

A system includes a motor, a frame, and connecting bolts. The motor includes a shaft. The frame is configured to house the motor. The frame includes connection holes and a base. Two or more of the connection holes are selected corresponding to a selected height of the shaft. The base is configured to mount the motor onto a foundation. Each of the connecting bolts is configured to pass through a respective connection hole and bolt to the motor to secure the motor to the frame.

12 Claims, 6 Drawing Sheets

(56) References Cited

OTHER PUBLICATIONS

Kolar et al., "Analysis of a Wide Speed Range Starter/Alternator System Based on a Novel Converter Topology for Series/Parallel Stator Winding Configuration," IEEE Industry Applications Society Annual Meeting, Phoenix, AZ, Oct. 3-7, 1999; IEEE, 1999, 11 pages.

overlyhautz.com, [online], "Conversion Bases" available on or before Nov. 26, 2013, via Internet Archive: Wayback Machine URL <https://web.archive.org/web/20131126161138/https://www.overlyhautz.com/adaptomounts1.html>, retrieved on Dec. 5, 2019, URL <https://www.overlyhautz.com/adaptomounts1.html>, 1 page.

"STABLE™ Motor Slide Bases," Automation Direct, available on or before Oct. 4, 2011, via Internet Archive: Wayback Machine, 4 pages.

"Style B2 NEMA Steel Adjustable Motor Bases," Overly Hautz Motor Base Company, available on or before Aug. 9, 2016, via Internet Archive: Wayback Machine, 1 page.

PCT International Search Report and Written Opinion in International Appln. No. PCT/US2021/018375, dated May 31, 2021, 17 pages.

\* cited by examiner

ADJUSTABLE MOTOR DRIVE

TECHNICAL FIELD

This disclosure relates to motor drive systems.

BACKGROUND

An electric motor is a machine that converts electrical energy into mechanical energy. Many electric motors generate a magnetic field that interacts with an electric current in a wire winding to generate force in the form of rotation of a shaft. Some electric motors are powered by direct current (DC) sources. Some electric motors are powered by alternating current (AC) sources. Universal motors can be powered by either DC or AC sources. AC motors can be fixed-speed or variable-speed control type. AC motors can be synchronous or asynchronous type.

SUMMARY

This disclosure describes technologies relating to motor drive systems. Certain aspects of the subject matter described can be implemented as a system. The system includes a motor, a frame, and multiple connecting bolts. The motor includes a shaft. The motor is configured to operate at a range of power output levels. The frame is configured to house the motor. The frame includes multiple connection holes and a base. Two or more of the connection holes are selected corresponding to a selected height of the shaft. The base is configured to mount the motor (housed in the frame) onto a foundation. Each of the connecting bolts is configured to pass through a respective connection hole and bolt to the motor to secure the motor to the frame.

This, and other aspects, can include one or more of the following features.

The base can include multiple mounting openings. The system can include multiple attachments. Each of the attachments can be configured to engage with a corresponding mounting opening. When engaged with the mounting openings, the attachments are configured to enable the base to mount onto another foundation of a different size.

Each attachment can include a peg configured to pass through the corresponding mounting opening. Each mounting opening can include multiple end points. Each different configuration, in which each of the pegs is positioned at one of the end points of the corresponding mounting opening, can correspond to a different size of foundation upon which the base can mount.

The motor can be configured to operate at power output levels in a range from 500 horsepower (hp) to 1,500 hp.

The motor can be configured to operate at power output levels in a range from 1,500 hp to 3,000 hp.

The motor can be configured to operate at power output levels in a range from 3,000 hp to 5,000 hp.

The motor can have a voltage rating in a range from 1,000 V to 15,000 V.

Certain aspects of the subject matter described can be implemented as a method. A motor is positioned within a motor frame. The motor includes a shaft. The motor frame includes multiple connection holes and a base. A set of connection holes is selected based on a desired height of the shaft. Multiple connecting bolts are passed through the selected set of connection holes. Each of the connecting bolts are bolted to the motor to secure the motor to the motor frame. The base is mounted onto a foundation.

This, and other aspects, can include one or more of the following features.

The base can include multiple mounting openings. Mounting the base onto the foundation can include engaging multiple attachments with corresponding mounting openings and mounting the attachments onto the foundation.

Each of the attachments can include a peg that is configured to pass through a corresponding mounting opening. Each of the mounting openings can include multiple end points. A set of end points of the mounting openings can be selected based on a desired footprint of the motor frame, corresponding to the foundation upon which the base is to be mounted. Each peg can be passed through the corresponding mounting opening. The pegs can be positioned at the selected set of end points.

The foundation can be a first foundation. The motor frame can be unmounted from the first foundation. The motor frame can be mounted onto a second foundation. The motor can be operated at a second power output level within the range from 500 hp to 5,000 hp.

Mounting the motor frame onto the second foundation can include selecting a second set of end points of the mounting openings based on a second desired footprint of the motor frame, corresponding to the second foundation upon which the motor frame is to be mounted. Mounting the motor frame onto the second foundation can include positioning the pegs at the selected second set of end points.

The height of the shaft can be adjusted. Adjusting the height of the shaft can include unbolting the connecting bolts from the motor, removing the connecting bolts from the selected connection holes, selecting a second set of connection holes based on a second desired height of the shaft, passing the connecting bolts through the selected second set of connection holes, and bolting the connecting bolts to the motor to secure the motor to the motor frame.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Facilities that utilize motor power typically have spare motors on reserve in case one or more motors malfunction, so that the defective motor can be replaced with minimal down time in operations. It is common for such facilities to store at least one spare motor for many (if not all) of the types and sizes of motors that are used in the facility. In some cases, facilities store multiple spares, especially for motors that are identified as being critical to the operations of the facility. Storing spare motors requires space. In some cases, a spare motor is never used and remains in storage. Furthermore, accurate tracking of spare motors (for example, their commissioning and inventory) is typically necessary to ensure that an adequate number of spare(s) is available at all times. Management of spare motors and their storage can be costly.

The subject matter described in this disclosure can be implemented in particular implementations, so as to realize one or more of the following advantages. First, the adjustable motor drive system described in this disclosure can be used for a variety of motor configurations and sizes. Second, the adjustable motor drive system includes a motor with a wide output range, an adjustable frame, and mount. Third, the shaft height and footprint of the adjustable motor drive system are both independently adjustable. The rigidity of the adjustable frame is less than that of a fixed frame. Fourth, the bearings of the adjustable motor drive system are self-lubricating, such that oil inlet and outlet pipe connections are not necessary. Fifth, the adjustable frame includes multiple connection holes that can be selected for varying motor shaft heights. Sixth, the mount includes multiple mounting holes that can be selected for varying foundations. Seventh, a footprint attachment can be included to match the adjustable frame to an existing footprint size. Eight, the versatility imparted by these characteristics allows the adjustable motor drive system to function as a spare for a variety of motors. Ninth, the adjustable motor drive system can be designed for temporary use. For example, the adjustable motor drive system can be installed when a motor malfunctions and then can be uninstalled once the original motor is repaired or a newly ordered motor arrives to the facility. Tenth, the adjustable motor drive system allows for the flexibility of a facility to order new motors only when absolutely necessary in contrast to ordering motors to keep spare motors (which may never be used) on reserve.

Figure 1:
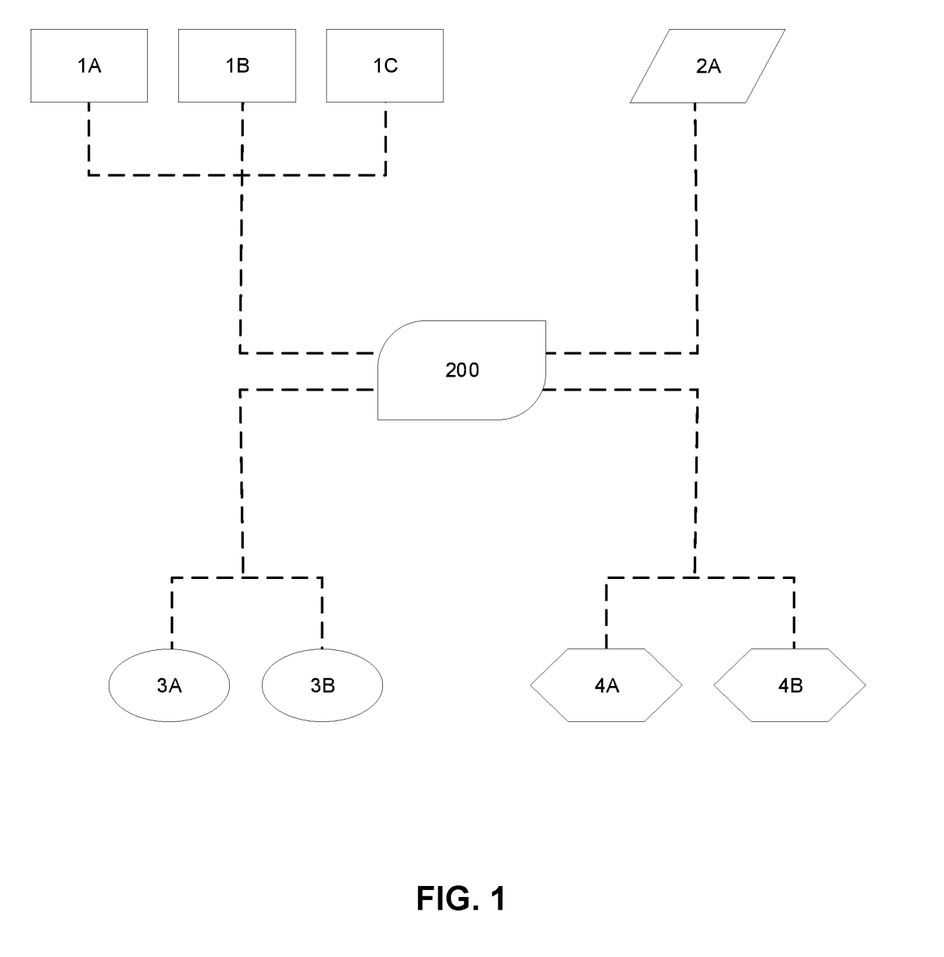
FIG. 1 is a schematic diagram of an example system including an example adjustable motor drive system.

Referring to FIG. 1, an example facility includes various motors. Motors 1A, 1B, and 1C are identical and have a first set of characteristics (for example, size, configuration, and power output). Motor 2A has a second set of characteristics. Motors 3A and 3B are identical and have a third set of characteristics. Motors 4A and 4B are identical and have a fourth set of characteristics. The first, second, third, and fourth sets of characteristics are different from each other. There can be overlap in one or more of the characteristics of any two of the first, second, third, and fourth sets, but none of the sets are identical. The adjustable motor drive system 200 can serve as a spare for any of the motors 1A, 1B, 1C, 2A, 3A, 3B, 4A, or 4B. The adjustable motor drive system 200 may need to be adjusted to function as a spare. For example, the adjustable motor drive system 200 can operate as a spare for motor 1C. The adjustable motor drive system 200 can then be uninstalled and subsequently re-installed to operate as a spare for motor 3B. The adjustable motor drive system 200 may be adjusted in between operating as a spare for motor 1C and operating as a spare for motor 3B. The adjustable motor drive system 200 is described in more detail later.

Although shown in FIG. 1 as including motors 1A, 1B, 1C, 2A, 3A, 3B, 4A, and 4B, the facility can include additional or fewer motors. For example, the facility can include additional or fewer motors that are identical to motors 1A, 1B, and 1C. For example, the facility can include additional or fewer motors that are identical to motor 2A. For example, the facility can include additional or fewer motors that are identical to motors 3A and 3B. For example, the facility can include additional or fewer motors that are identical to motors 4A and 4B. For example, the facility can include additional motors that are different from motors 1A, 1B, 1C, 2A, 3A, 3B, 4A, or 4B. The adjustable motor drive system 200 can serve as a spare for any two or more different motors (in terms of characteristics) in the facility.

Figure 2A:
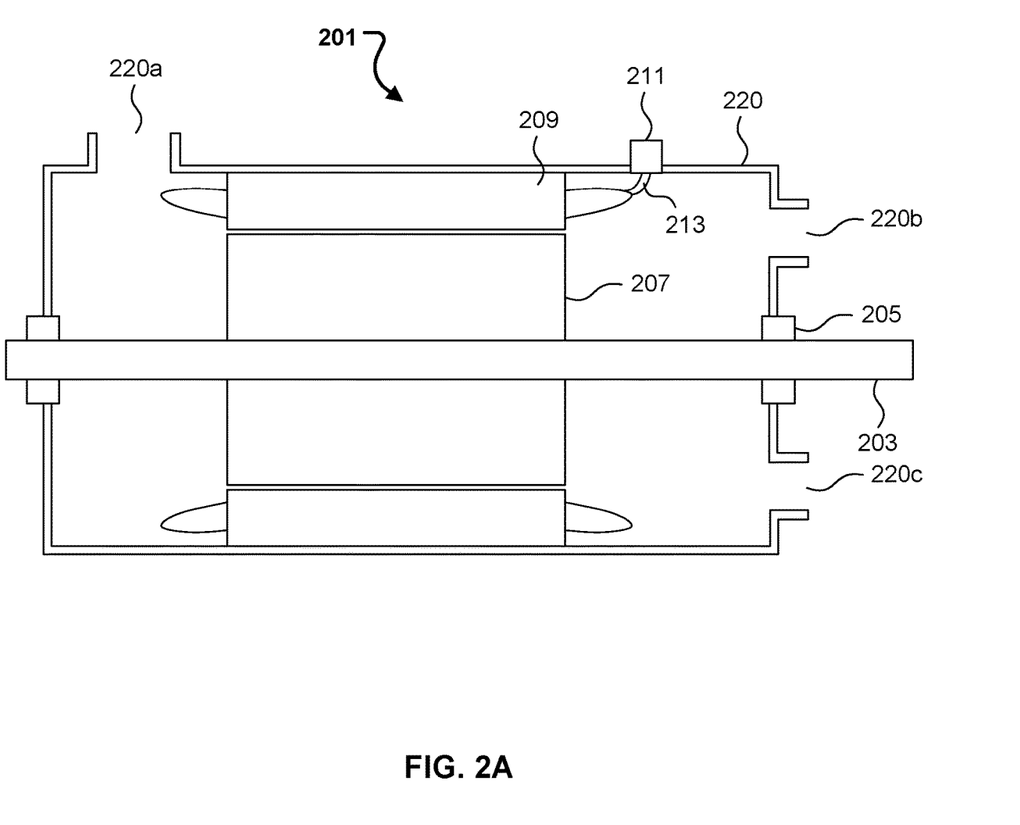
FIG. 2A is a cross-sectional side view of an example motor.

FIG. 2A is a cross-sectional side view of a motor 201. The motor 201 includes a shaft 203. In response to receiving power, the motor 201 is configured to rotate the shaft 203. The shaft 203 can be coupled to another rotating equipment, such as a pump or compressor, to drive rotation of that rotating equipment. In some implementations, the motor 201 is powered by an alternating current (AC) source. In some implementations, the motor 201 is fixed-speed type. In some implementations, the motor 201 is variable-speed control type. In some implementations, the motor 201 is asynchronous type (for example, the motor 201 is an induction motor).

The motor 201 is configured to operate at a range of power output levels. In some implementations, the motor 201 is configured to operate at power output levels in a range from about 500 horsepower (hp) to about 5,000 hp. In some implementations, the motor 201 is configured to operate at power output levels in a range from about 500 hp to about 1,500 hp. In some implementations, the motor 201 is configured to operate at power output levels in a range from about 1,500 hp to about 3,000 hp. In some implementations, the motor 201 is configured to operate at power output levels in a range from about 3,000 hp to about 5,000 hp.

In some implementations, the motor 201 has a voltage rating in a range from about 1,000 volts (V) to about 15,000 V. In some implementations, the motor 201 has a voltage rating in a range from about 1,000 V to about 10,000 V. In some implementations, the motor 201 has a voltage rating in a range from about 10,000 V to about 15,000 V.

The motor 201 includes a rotor 207 coupled to the shaft 203. The motor 201 includes a stator 209. The rotor 207 rotates during operation of the motor 201. The stator 209 remains stationary during operation of the motor 201. By nature of the shaft 203 being coupled to the rotor 207, the shaft 203 rotates with the rotor 207. The stator 209 can be configured to drive rotation of the rotor 207 during operation of the motor 201. In some implementations, the stator 209 is connected to an electric terminal 211 by a cable 213. The electric terminal 211 can serve as the connection point for the motor 201 to connect to a power supply. In response to receiving power, the stator 209 generates a rotating magnetic field. The rotor 207 and the stator 209 magnetically interact with one another. The rotor 207 rotates in response to the rotating magnetic field generated by the stator 209. Therefore, in response to receiving power, the stator 209 drives rotation of the rotor 207, and in turn, rotation of the shaft 203.

The rotor 207 and stator 209 can be housed in a casing 220. The shaft 203 can pass through the casing 220, such that at least a portion of the shaft 203 is housed in the casing 220. The motor 201 can include one or more bearings 205 that support the physical contact between the shaft 203 and the casing 220. The one or more bearings 205 constrain motion of the shaft 203 relative to the casing 220 to rotational movement of the shaft 203 (for example, as opposed to axial movement). The one or more bearings 205 can include an axial bearing, a radial bearing, or both. An axial bearing constrains axial movement of the shaft 203 relative to the casing 220. A radial bearing constrains radial movement of the shaft 203 relative to the casing 220. The one or more bearings 205 reduces friction between the shaft 203 and the casing 220 during rotation of the shaft 203. In some implementations, the one or more bearings 205 include sleeve bearings, ball bearings, or both. In some implementations, the one or more bearings 205 are lubricated, for example, with lubrication oil.

In some implementations, the casing 220 includes one or more openings (for example, openings 220a, 220b, 220c). Such openings can allow for air circulation which can facilitate heat dissipation (cooling) during operation of the motor 201. Although shown in FIG. 2A as having three openings (220a, 220b, 220c), the casing 220 can include fewer or additional openings. In some implementations, the casing 220 includes only one opening for air circulation. In some implementations, the casing 220 includes only two openings for air circulation. In some implementations, the casing 220 includes four or more openings for air circulation. In some implementations, the casing 220 does not include any openings for air circulation. In some implementations, the motor 201 includes a cooling system (not shown). As an example, the motor 201 can include a cooling jacket. The cooling jacket can include a cooling fluid, such as water. As another example, the motor 201 can include a water pipe within the casing 220 for the flow of water through the motor 201 as a heat sink. In some implementations, the casing 220 includes one or more openings for air circulation and a cooling system.

Figure 2B:
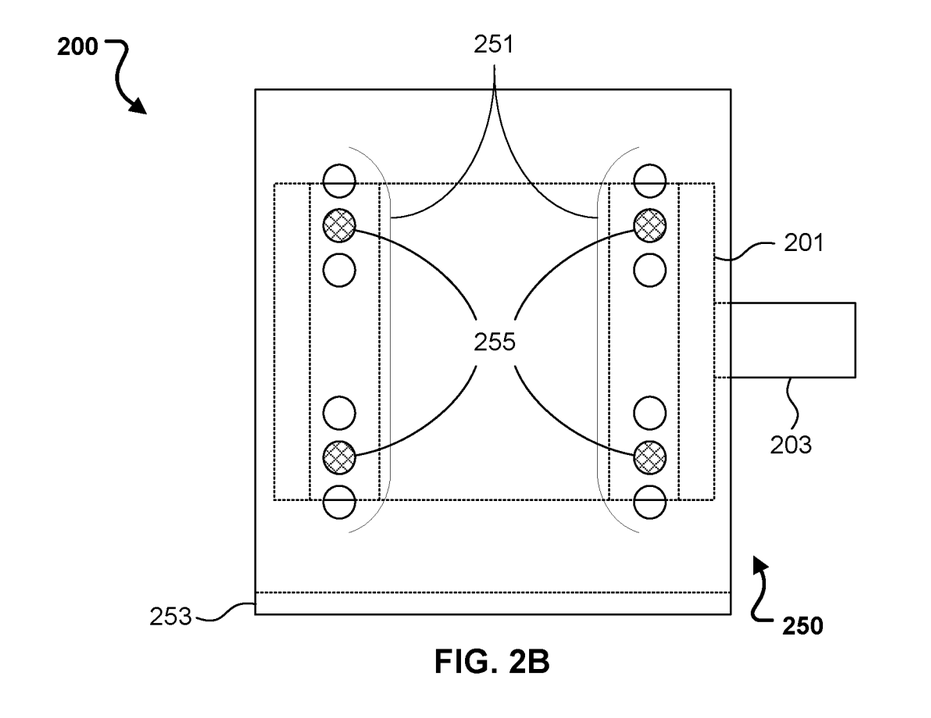
FIG. 2B is a side view of an example adjustable motor drive system that includes the motor of FIG. 2A.
Figure 2C:
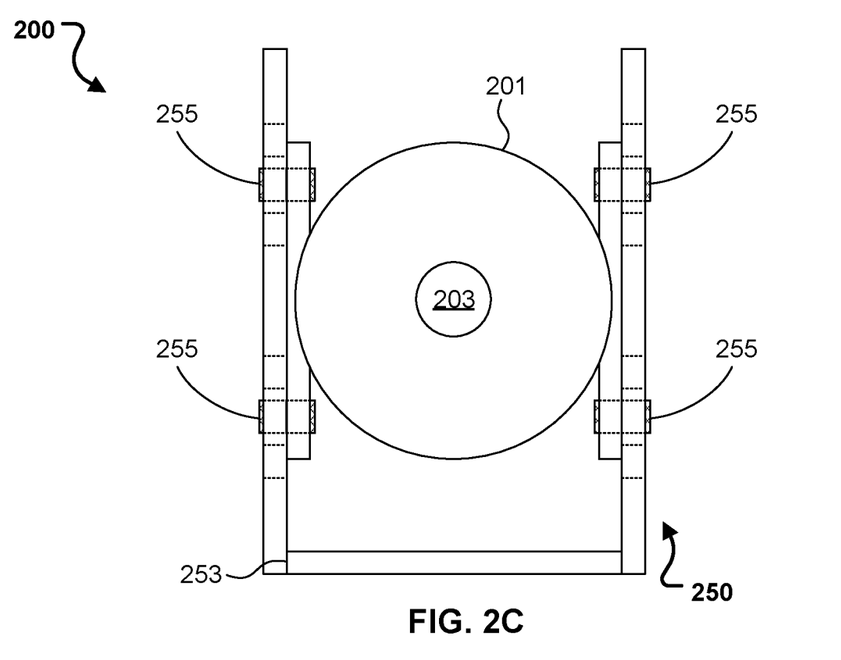
FIG. 2C is a front view of the adjustable motor drive system of FIG. 2B.

FIGS. 2B and 2C are side and front views, respectively, of an implementation of the adjustable motor drive system 200. The adjustable motor drive system 200 includes the motor 201, a frame 250, and multiple connecting bolts 255.

The frame 250 is configured to house the motor 201. The frame 250 includes multiple connection holes 251. Two or more of the connection holes 251 are selected corresponding to a selected height of the shaft 203. The frame 250 includes a base 253 that is configured to mount the motor 201 housed in the frame 250 onto a foundation. The base 253 is described in more detail later.

In some implementations, as shown in FIG. 2C, the frame 250 includes two walls that are connected to the base 253. Each of the walls can define multiple connection holes 251. In some implementations, each connection hole 251 on one of the walls corresponds to a connection hole 251 on the other wall, for example, at the same height in relation to the base 253. Although shown in FIG. 2C as having two walls, the frame 250 can include additional walls (for example, three or four walls). The additional walls can optionally include additional connection holes 251. In some implementations, the frame 250 is made of metal. For example, the frame 250 can be made of carbon steel, stainless steel, aluminum, cast iron, or cast aluminum.

Although shown in FIG. 2B as having twelve connection holes 251, each wall of the frame 250 can include fewer or additional connection holes 251. In some implementations, each wall of the frame 250 includes four connection holes 251. In some implementations, each wall of the frame 250 includes six connection holes 251. In some implementations, each wall of the frame 250 includes eight connection holes 251. In some implementations, each wall of the frame 250 includes ten connection holes 251. In some implementations, each wall of the frame 250 includes fourteen or more connection holes 251. In some implementations, each wall of the frame 250 includes the same number of connection holes 251, and each connection hole 251 of one wall corresponds to a connection hole 251 of another wall. In some implementations, not all of the walls of the frame 250 includes the same number of connection holes 251.

Each of the connecting bolts 255 are configured to pass through a respective connection hole 251 and bolt to the motor 201 to secure the motor 201 to the frame 250. Although shown in FIG. 2C as being cylindrical, the connecting bolts 255 can have any shape. In some implementations, the connecting bolts 255 have the shape of a rectangular prism. The connection holes 251 have shapes corresponding to the shapes of the connecting bolts 255, so that the connecting bolts 255 can pass through the connection holes 251. For example, if the connecting bolts 251 have the shape of a rectangular prism, then the connection holes 251 are rectangular. For example, if the connecting bolts 251 have a cylindrical shape, then the connection holes 251 are elliptic. In some implementations, the connecting bolts 255 are threaded, and the connection holes 251 are also threaded. The connecting bolts 255 are constructed by a sturdy material, such as metal. For example, the connecting bolts 255 are made of carbon steel, stainless steel, aluminum, titanium, or carbon fiber.

Although shown in FIGS. 2B and 2C as having eight connecting bolts 255, the adjustable motor drive system 200 can include fewer or additional connecting bolts 255. In some implementations, the adjustable motor drive system 200 includes two connecting bolts 255. In some implementations, the adjustable motor drive system 200 includes four connecting bolts 255. In some implementations, the adjustable motor drive system includes six connecting bolts 255. In some implementations, the adjustable motor drive system includes ten or more connecting bolts 255.

A set of the connection holes 251 can be selected based on the desired height of the shaft 203. For example, in the implementation shown in FIG. 2B, there are three sets of connection holes 251 that can be selected: a first set of bottom connection holes 251 of each cluster, a second set of middle connection holes 251 of each cluster (this is selected in FIG. 2B, specifically), and a third set of top connection holes 251 of each cluster. Selecting the first set corresponds to the shortest height of the shaft 203 possible for the specific frame 250 shown in FIG. 2B. Selecting the second set corresponds to a medium height of the shaft 203 for the specific frame 250 shown in FIG. 2B. Selecting the third set corresponds to the tallest height of the shaft 203 possible for the specific frame 250 shown in FIG. 2B. In each of the first, second, and third sets, a total of eight connection holes 251 are selected. However, the first, second, and third sets are not the only sets possible for the adjustable motor drive system 250. For example, another set can include a selection of fewer or additional connection holes 251. In some implementations, a set includes a selection of four connection holes 251. In some implementations, a set includes a selection of six connection holes 251. In some implementations, a set includes a selection of ten or more connection holes 251.

Figure 2D:
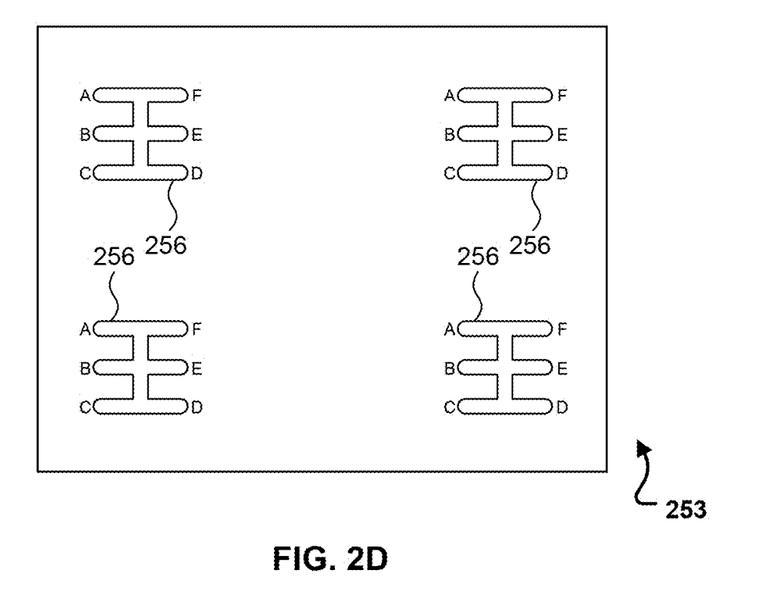
FIG. 2D is a top view of an example base of the adjustable motor drive system of FIG. 2B.

FIG. 2D is a top view of an implementation of the base 253. In some implementations, the base 253 includes multiple mounting openings 256. Each of the mounting openings 256 includes multiple end points (for example, end points A, B, C, D, E, and F). In some implementations, the base 253 is made of metal. For example, the base 253 is made of carbon steel, stainless steel, aluminum, cast iron, or cast aluminum. In some implementations, the frame 250 and the base 253 are formed as a unitary body (that is, the frame 250 and the base 253 are formed as a singular piece of equipment). In some implementations, the frame 250 and the base 253 are formed as separate components that are coupled together, for example, by welding or fastening.

Although shown in FIG. 2D as having four mounting openings 256, the base 253 can include fewer or additional mounting openings 256. For example, the base 253 can include three mounting openings 256. Although shown in FIG. 2D as having six end points (A, B, C, D, E, F), each of the mounting openings 256 can include fewer or additional end points. In some implementations, all of the mounting openings 256 have the same number of end points. In some implementations, not all of the mounting openings 256 have the same number of end points.

The mounting openings 256 can have any shape that is different from the shapes shown in FIG. 2D. For example, the mounting openings 256 can resemble a capital letter "E", a capital letter "F", a capital letter "H", a capital letter "I", a capital letter "K", a capital letter "L", a capital letter "M", a capital letter "N", a capital letter "S", a capital letter "T", a capital letter "U", a capital letter "V", a capital letter "W", a capital letter "X", a capital letter "Y", or a capital letter "Z". In some implementations, all of the mounting openings 256 have the same shape (as shown in FIG. 2D). In some implementations, not all of the mounting openings 256 have the same shape.

Figure 2E:
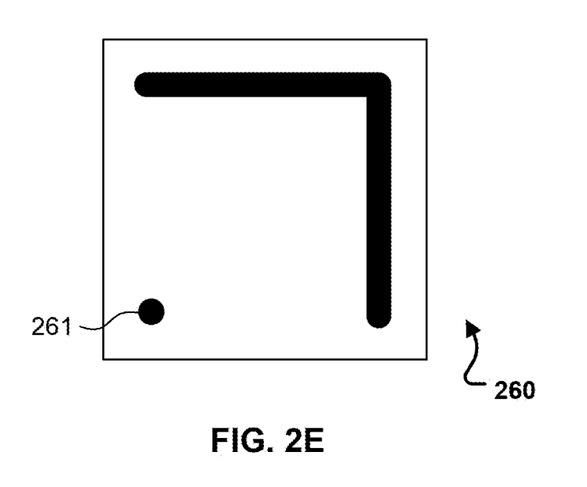
FIG. 2E is a top view of an example attachment that can couple to the base of the adjustable motor drive system of FIG. 2D.

FIG. 2E is a top view of an implementation of an attachment 260 that can couple to the base 253. The attachment 260 is configured to engage with one of the mounting openings 256 of the base 253. The attachment 260 includes a peg 261 that is configured to pass through one of the mounting openings 256. The peg 261 can be positioned at any one of the end points A, B, C, D, E, or F of the mounting opening 256.

The peg 261 can have any shape as long as it protrudes from the attachment 260. The protruding portion of the peg 261 is the portion that passes through one of the mounting openings 256 of the base 253. In some implementations, the peg 261 has the shape of a rectangular prism. In some implementations, the peg 261 has a cylindrical shape. The mounting openings 256 have shapes corresponding to the shape of the peg 261, so that the peg 261 can pass through the mounting opening 256. The peg 261 is constructed by a sturdy material, such as metal. For example, the peg 261 is made of carbon steel, stainless steel, aluminum, titanium, or carbon fiber.

Although shown in FIG. 2E as being rectangular, the attachment 260 can have any shape, for example, triangular or circular. The attachment 260 is constructed by a sturdy material, such as metal. For example, the attachment 260 is made of carbon steel, stainless steel, aluminum, titanium, or carbon fiber.

Figure 2F:
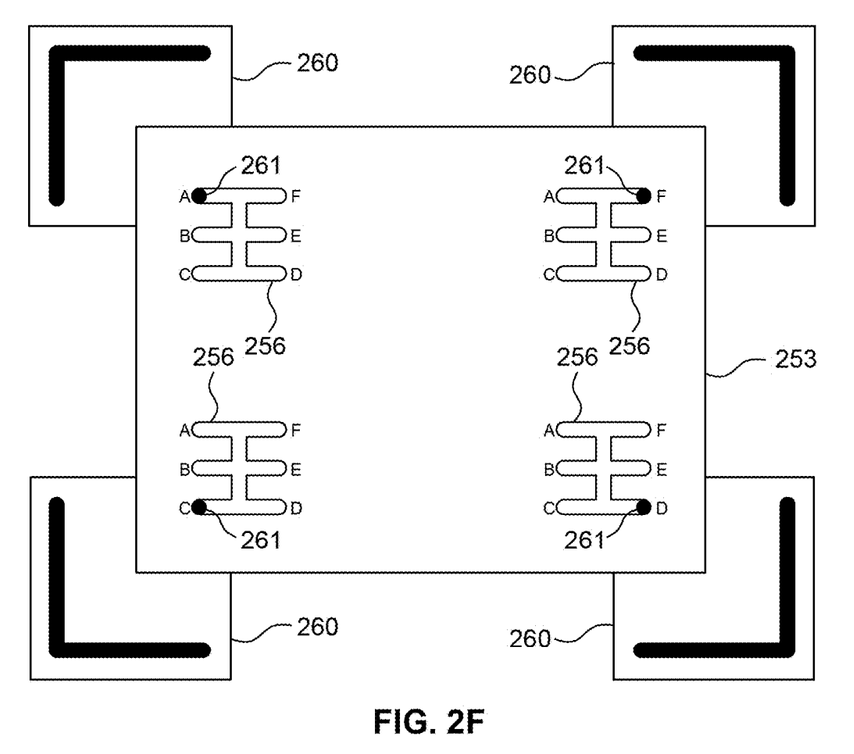
FIG. 2F is a top view of the base of the adjustable motor drive system of FIG. 2B coupled to multiple attachments.
Figure 2G:
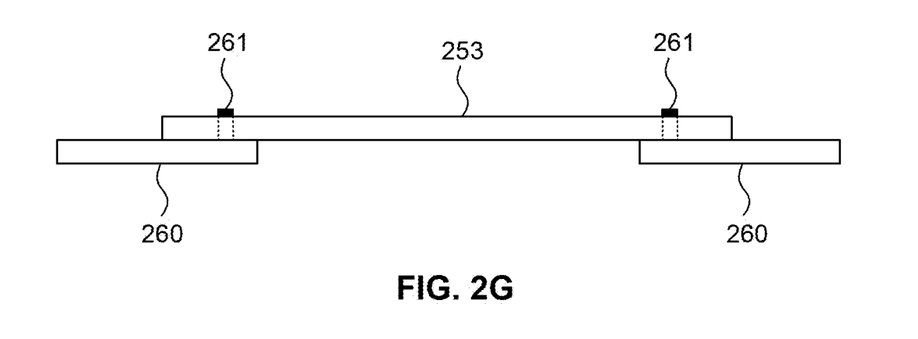
FIG. 2G is a side view of the base coupled to the multiple attachments of FIG. 2F.

FIGS. 2F and 2G are top and side views, respectively, of an implementation of the base 253 that is coupled to multiple attachments 260. In this implementations, four attachments 260 are coupled with the based 253. When engaged with the mounting openings 255 of the base 253, the attachments 260 are configured to enable the base 253 to mount onto another foundation of a different size in comparison to a base 253 that is not coupled to any attachments 260 (for example, shown in FIG. 2D).

As shown in FIG. 2F, peg 261 of top-left attachment 260 is positioned at end point A of top-left mounting opening 256; peg 261 of top-right attachment 260 is positioned at end point F of top-right mounting opening 256; peg 261 of bottom-left attachment 260 is positioned at end point C of bottom-left mounting opening 256; and peg 261 of bottom-right attachment 260 is positioned at end point D of bottom-right mounting opening 256. The various pegs 261 of the four attachments 260 can be positioned at different end points of the corresponding mounting openings 256. Each different configuration, in which each of the pegs 261 is positioned at one of the end points of the corresponding mounting opening 256, can correspond to a different size of foundation upon which the base 253 can mount.

Figure 3:
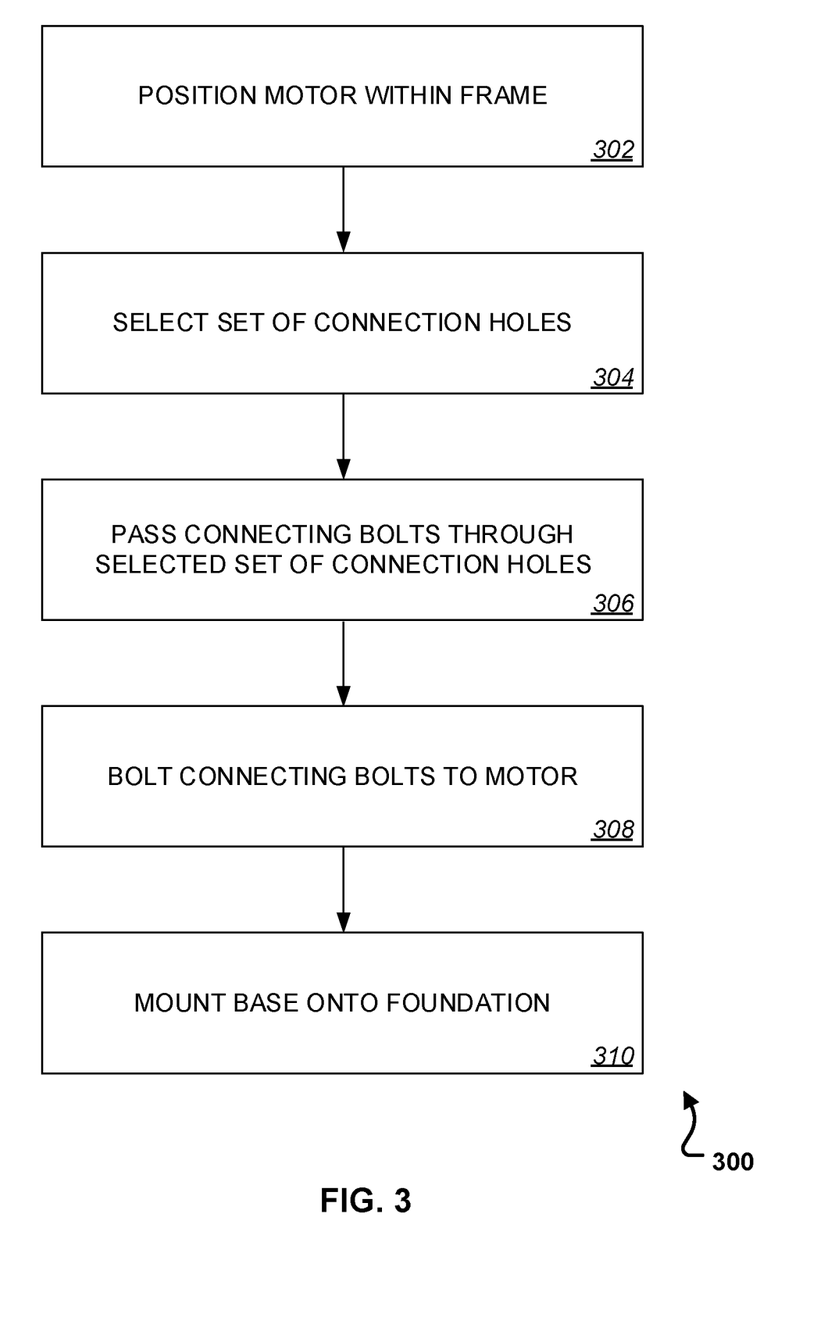
FIG. 3 is a flow chart of an example method for using the adjustable motor drive system.

FIG. 3 is a flow chart of an example method 300 for using the adjustable motor drive system 200. At step 302, a motor (for example, the motor 201) is positioned within a motor frame (for example, the frame 250). As mentioned previously, the motor 201 includes a shaft 203, and the frame 250 includes multiple connection holes 251 and a base 253.

At step 304, a set of connection holes 251 are selected from the multiple connection holes 251 based on a desired height of the shaft 203. For example, in the implementation shown in FIG. 2B, there are three sets of connection holes 251 that can be selected: the first set of bottom connection holes 251 of each cluster, the second set of middle connection holes 251 of each cluster (this is shown in FIG. 2B, specifically), and the third set of top connection holes 251 of each cluster. Selecting the first set corresponds to the shortest height of the shaft 203 possible for the specific frame 250 shown in FIG. 2B. Selecting the second set corresponds to a medium height of the shaft 203 for the specific frame 250 shown in FIG. 2B. Selecting the third set corresponds to the tallest height of the shaft 203 possible for the specific frame 250 shown in FIG. 2B. The first, second, and third sets are not the only sets possible for the adjustable motor drive system 250. A set of connection holes 251 different from the first, second, or third sets can be selected at step 304.

At step 306, multiple connecting bolts (for example, the connecting bolts 255) are passed through the selected set of connection holes 251. The number of connecting bolts 255 used at step 306 corresponds to the number of connection holes 251 that are selected as part of the set of connection holes 251 at step 304.

At step 308, each of the connecting bolts 255 are bolted to the motor 201 to secure the motor 201 to the frame 250.

At step 310, the base 253 is mounted onto a foundation. For example, the base 253 can be bolted to a foundation. As mentioned previously, the base includes multiple mounting openings 256. Mounting the base 253 onto the foundation at step 310 can include engaging attachments 260 with the mounting openings 256 and mounting the attachments 260 onto the foundation.

As mentioned previously, each attachment 260 includes a peg 261 that is configured to pass through a corresponding mounting opening 256 of the base 253, and each of the mounting openings 256 includes multiple end points (for example, A, B, C, D, E, and F). In some implementations, a set of end points (out of the multiple ends points of the multiple mounting openings 256) is selected based on a desired footprint (area) of the frame 250, in which the desired footprint corresponds to a size of the foundation upon which the base 253 is to be mounted. Each peg 261 can be passed through a corresponding mounting opening 256 of the base 253. The pegs 261 can then be positioned at the selected set of end points.

After step 310, the motor 201 can be operated. In some implementations, the motor 201 is operated at a first power output level within a range from about 500 hp to about 5,000 hp. In some implementations, the motor 201 is operated at a first power output level within a range from about 500 hp to about 1,500 hp. In some implementations, the motor 201 is operated at a first power output level within a range from about 1,500 hp to about 3,000 hp. In some implementations, the motor 201 is operated at a first power output level within a range from about 3,000 hp to about 5,000 hp.

In some implementations, the adjustable motor drive system 200 is un-installed from one foundation (first foundation), moved, and re-installed onto another foundation (second foundation). In such implementations, the method 300 includes unmounting the frame 253 from the first foundation and mounting the frame 253 onto the second foundation.

In some implementations, mounting the frame 253 onto the second foundation includes selecting a second set of end points based on a desired footprint of the frame 250 that corresponds to a size of the second foundation upon which the frame 253 is to be mounted. Each peg 261 can be passed through a corresponding mounting opening 256 of the base 253. The pegs 261 can then be positioned at the selected second set of end points. In some implementations, the selected second set of end points for the second foundation is the same as the set of end points selected for the first foundation. In some implementations, the selected second set of end points for the second foundation is different from the set of end points selected for the first foundation.

In some implementations, the height of the shaft 203 is adjusted. Adjusting the height of the shaft 203 can include unbolting the connecting bolts 255 from the motor 201, removing the connecting bolts 255 from the connection holes 251, selecting a second set of connection holes 251 based on a second desired height of the shaft 203, passing the connecting bolts 255 through the selected second set of connection holes 251, and re-bolting the connecting bolts 255 to the motor 201 to re-secure the motor 201 to the motor frame 250. The second set of connection holes 251 is different from the first set of connection holes 251 before the adjustment of the height of the shaft 203.

Once the adjustable motor drive system 200 has been installed on the second foundation, the motor 201 can be operated again. In some implementations, the motor 201 is operated at a second power output level within a range from about 500 hp to about 5,000 hp. In some implementations, the motor 201 is operated at a second power output level within a range from about 500 hp to about 1,500 hp. In some implementations, the motor 201 is operated at a second power output level within a range from about 1,500 hp to about 3,000 hp. In some implementations, the motor 201 is operated at a second power output level within a range from about 3,000 hp to about 5,000 hp. The first and second power output levels are within the same power output range (for example: 500 hp to 1,500 hp; 1,500 hp to 3,000 hp; 3,000 hp to 5,000 hp; or 500 hp to 5,000 hp). In some implementations, the first and second power output levels are the same. In some implementations, the first and second power output levels are different.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination. Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
  a motor comprising a shaft, the motor configured to operate at a range of power output levels;
  a frame configured to house the motor, the frame comprising:
    a plurality of connection holes, wherein two or more of the connection holes are selected corresponding to a selected height of the shaft; and
    a base configured to mount the motor housed in the frame onto a foundation, the base comprising a plurality of mounting openings, each of the plurality of mounting openings comprising a plurality of end points;
  a plurality of connecting bolts, each of the plurality of connecting bolts configured to pass through a respective connection hole of the plurality of connection holes and bolt to the motor to secure the motor to the frame; and a plurality of attachments, each of the plurality of attachments configured to engage with a corresponding mounting opening of the plurality of mounting openings, each of the plurality of attachments comprising a peg configured to pass through the corresponding mounting opening of the plurality of mounting openings, wherein the plurality of attachments, when engaged with the plurality of mounting openings, is configured to enable the base to mount onto another foundation of a different size, and each different configuration, in which each of the pegs is positioned at one of the plurality of end points of the corresponding mounting opening of the plurality of mounting openings, corresponds to a different size of foundation upon which the base can mount.

2. The system of claim 1, wherein the motor is configured to operate at power output levels in a range from 500 horsepower to 1,500 horsepower.

3. The system of claim 1, wherein the motor is configured to operate at power output levels in a range from 1,500 horsepower to 3,000 horsepower.

4. The system of claim 1, wherein the motor is configured to operate at power output levels in a range from 3,000 horsepower to 5,000 horsepower.

5. The system of claim 1, wherein the motor has a voltage rating in a range from 1,000 V to 15,000 V.

6. A method comprising:
 positioning a motor within a motor frame, the motor comprising a shaft, the motor frame comprising a plurality of connection holes and a base, the base comprising a plurality of mounting openings, each of the plurality of mounting openings comprising a plurality of end points;
 selecting a set of connection holes from the plurality of connection holes based on a desired height of the shaft;
 passing a plurality of connecting bolts through the selected set of connection holes;
 bolting each of the plurality of connecting bolts to the motor to secure the motor to the motor frame;
 mounting the base onto a foundation, wherein mounting the base onto the foundation comprises:
  engaging a corresponding plurality of attachments with the plurality of mounting openings, wherein each of the plurality of attachments comprise a peg configured to pass through the corresponding mounting opening of the plurality of mounting openings, and engaging the corresponding plurality of attachments with the plurality of mounting openings comprises:
   selecting a set of end points from the plurality of end points of the plurality of mounting openings based on a desired footprint of the motor frame corresponding to the foundation upon which the base is to be mounted;
   passing each peg through the corresponding mounting opening of the plurality of mounting openings; and
   positioning the pegs at the selected set of end points; and
  mounting the plurality of attachments onto the foundation.

7. The method of claim 6, comprising operating the motor at a first power output level within a range from 500 horsepower to 5,000 horsepower.

8. The method of claim 7, wherein the foundation is a first foundation, and the method comprises:
 unmounting the motor frame from the first foundation;
 mounting the motor frame onto a second foundation; and
 operating the motor at a second power output level within the range from 500 horsepower to 5,000 horsepower.

9. The method of claim 8, wherein mounting the motor frame onto the second foundation comprises:
 selecting a second set of end points from the plurality of end points of the plurality of mounting openings based on a second desired footprint of the motor frame corresponding to the second foundation upon which the motor frame is to be mounted; and
 positioning the pegs at the selected second set of end points.

10. The method of claim 7, comprising adjusting the height of the shaft, wherein adjusting the height of the shaft comprises:
 unbolting the plurality of connecting bolts from the motor;
 removing the plurality of connecting bolts from the selected connection holes;
 selecting a second set of connection holes from the plurality of connection holes based on a second desired height of the shaft;
 passing the plurality of connecting bolts through the selected second set of connection holes; and
 bolting the plurality of connecting bolts to the motor to secure the motor to the motor frame.

11. The method of claim 10, wherein the foundation is a first foundation, and the method comprises:
 unmounting the motor frame from the first foundation;
 mounting the motor frame onto a second foundation; and
 operating the motor at a second power output level within the range from 500 horsepower to 5,000 horsepower.

12. The method of claim 11, wherein mounting the motor frame onto the second foundation comprises:
 selecting a second set of end points from the plurality of end points of the plurality of mounting openings based on a second desired footprint of the motor frame corresponding to the second foundation upon which the motor frame is to be mounted; and
 positioning the pegs at the selected second set of end points.

* * * * *